US007243018B2

(12) United States Patent
Ahn

(10) Patent No.: US 7,243,018 B2
(45) Date of Patent: Jul. 10, 2007

(54) METHOD OF IDENTIFYING NONCOMPLIANT FUEL IN AN AUTOMOTIVE VEHICLE

(75) Inventor: Cheol-Joon Ahn, Gunpo-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 49 days.

(21) Appl. No.: 11/305,697

(22) Filed: Dec. 15, 2005

(65) Prior Publication Data

US 2007/0079812 A1 Apr. 12, 2007

(30) Foreign Application Priority Data

Oct. 10, 2005 (KR) ...................... 10-2005-0094826

(51) Int. Cl.
*G06F 17/00* (2006.01)
*F02M 51/00* (2006.01)
*F02D 41/06* (2006.01)

(52) U.S. Cl. ...................... 701/104; 701/110; 701/113; 123/480; 123/491

(58) Field of Classification Search ........... 123/179.16, 123/478, 480, 491, 494; 701/101–105, 110, 701/111, 113
See application file for complete search history.

(56) References Cited

U.S. PATENT DOCUMENTS 4,556,029 A * 12/1985 Yamaguchi et al. ........ 123/491
5,265,581 A * 11/1993 Nagaishi ..................... 123/675
5,572,978 A * 11/1996 Ogawa ....................... 123/491
5,582,157 A * 12/1996 Uchikawa ................... 123/676
5,690,074 A * 11/1997 Ogawa ....................... 123/491
5,735,241 A * 4/1998 Matsuura .................... 123/491
5,881,703 A * 3/1999 Nankee et al. .............. 123/686
6,349,293 B1 * 2/2002 Yamaguchi .................... 706/2
6,405,122 B1 * 6/2002 Yamaguchi ................. 701/104

FOREIGN PATENT DOCUMENTS

JP 4259639 9/1992
JP 5060003 3/1993
JP 7083092 3/1995
JP 7286547 10/1995
JP 8086239 4/1996
JP 9324676 12/1997

* cited by examiner

*Primary Examiner*—Willis R. Wolfe, Jr.
(74) *Attorney, Agent, or Firm*—Morgan Lewis & Bockius LLP

(57) ABSTRACT

The present invention provides a method of identifying noncompliant fuel of a vehicle and improving drivability. The method comprises: (a) confirming a present coolant temperature after the vehicle has been started, (b) setting a coolant temperature factor value based on the coolant temperature, (c) setting an RPM reference value based on the RPM, (d) determining whether an RPM incremental value reaches the RPM reference value, (e) setting a calibration learning value if the RPM incremental value is smaller than the RPM reference value, (f) calculating a learning value of fuel injection volume, (g) calculating the fuel injection volume for start injection based on the calculated fuel injection volume, (h) determining whether a start state of the vehicle has completed, and (i) calculating the fuel injection volume after start injection and fuel injection for acceleration or deceleration if the start state has been completed.

10 Claims, 2 Drawing Sheets

FIG. 2

| |
|---|
| Coolant Temperature: -10°C to 0°C; factor value of coolant temperature: 1.05 |
| Coolant Temperature: 1°C to 10°C; factor value of coolant temperature: 1.1 |
| Coolant Temperature: 11°C to 40°C; factor value of coolant temperature: 1.15 |

FIG. 3

| |
|---|
| **If $0 \leq RPM < 300$: reference value $\Delta N_{150}$ is set to 150 RPM** |
| **If $300 \leq RPM < 700$: reference value $\Delta N_{150}$ is set to 150 RPM** |
| **If $700 \leq RPM < 1000$: reference value $\Delta N_{100}$ is set to 100 RPM** |

METHOD OF IDENTIFYING NONCOMPLIANT FUEL IN AN AUTOMOTIVE VEHICLE

CROSS-REFERENCE TO RELATED APPLICATIONS

The present application claims priority of Korean Application Serial Number 10-2005-0094826, filed on Oct. 10, 2005, with the Korean Intellectual Property Office, the disclosure of which is fully incorporated herein by reference.

FIELD OF THE INVENTION

The present invention relates generally to a method of identifying noncompliant fuel within an automotive vehicle.

BACKGROUND OF THE INVENTION

Operating in conjunction with a multiplicity of linked sensors, conventional Electronic Control Modules (ECMs) use intake air volume, engine rotation speed, water temperature and other sensor signals to control fuel injection volume in order to optimize the air-fuel ratio for the engine. These sensors are the ECM's eyes and ears and are used to determine how the engine is performing. Based on that information, the ECM can change the fuel-flow rate, spark timing, fuel injection volume, or idle speed to compensate or adapt to various conditions, e.g. standard temperature, fuel grade, or variation in atmospheric pressure at different altitudes.

One important sensor for feedback systems is the oxygen (O2) sensor. This sensor monitors exhaust-gas oxygen content and reports this information to the ECM. The $O_2$ sensor is typically located in the exhaust collector but ahead of any catalytic converter. Typically, the $O_2$ sensor does not activate until about 20 seconds after the vehicle has been cold started. During this time, the fuel injection is controlled on a non-feedback basis, i.e. in a pilot injection. In other words, the fuel injection volume is determined instead by the standard temperature, fuel grade, and atmospheric conditions.

Fuel grade is especially important critical to the performance and driveability of a vehicle. Automotive vehicles are designed to meet a number of requirements, such as those relating to emissions, drivability, and start ability. Despite the setting of strict fuel specification standards and penalties for the sale, transportation, and production of noncompliant fuels, such fuels often remain undetected and find their way to consumers. Attempts to weed out or identify such noncompliant fuels have been complicated due to effects of seasonal changes on fuel properties. The problem is further compounded since several different grades of fuels with their respectively different properties are used, and properties of even the same fuel can vary by season and geographical area.

Amongst the various properties of a fuel, volability is one of the most important. It has tremendous effect on a vehicle's operations, e.g. engine starting, driveability under cold and hot engine conditions, and tendency to vapor lock. Fuels that do not vaporize readily may cause hard starting of cold engines and poor vehicle driveability during warm-up and acceleration. Conversely, fuels that vaporize too readily in fuel pumps, lines, carburetors, or fuel injectors can cause decreased liquid flow to the engine, resulting in rough engine operation or stalling. There are several measures of fuel volatility; two of these are Reid vapor pressure (RVP) and distillation, driveability index (DI).

ASTM defines vapor pressure as "a factor in determining whether a fuel will cause vapor lock at high ambient temperature or high altitude, or will provide easy starting at low ambient temperature." Vapor pressure is the pressure exerted by vapor formed over a liquid in a closed container. RVP is the pressure measured in pounds per square inch (psi) using a specific instrument heated to 100° F. A lower RVP indicates that the gasoline is less volatile. Additionally, the RVP value determines the start ability of a vehicle; the lower an RVP value, the worse the start ability.

Distillation temperature measurements involve heating a fuel and measuring the temperature at which a certain percentage of the sample evaporates. DI index was developed to indicate gasoline performance during engine cold start and warm-up. The higher the DI value, the worse the drivability. As such, the use of non-compliant fuels has tremendous effects on the performance and driveability of a vehicle.

According to the prior art, fuel injection volume is simply increased so as to improve the start ability and drivability of a vehicle and to compensate for the effects of a non-compliant fuel. However, this imprecise increase of fuel injection volume leads to increased exhaust gas. Hence, the conventional method is an imperfect solution.

SUMMARY OF THE INVENTION

The present invention provides a method of identifying noncompliant fuel of an automotive vehicle based on real-time variations in RPM, thereby minimizing the likelihood of a misdiagnosis regarding the presence of noncompliant fuel. The noncompliant fuel refers to a fuel state that exceeds a reference value of the fuel grade, ice. RVP and DI, that is typically based on US-Spec Indolene (RVP=9.0, DI=1170) and Phase-3 (RVP=7.0, DI=1130). These reference values are designed to satisfy emission regulations and optimize drivability and start ability of vehicles. However, as non-compliant fuel is low in vaporization, i.e. low RVP, high DI, the same amount of non-compliant fuel, when injected into the intake port of a vehicle, results in significantly less fuel gas as compared with compliant fuel. With so little fuel gas being vaporized for the air-fuel mixture, an unsuitable air-fuel ratio is thereby produced and the vehicle performance and drivability diminished.

In the method of the present invention, once a fuel has been determined to be noncompliant based on the RPM readings, a calibration learning value is set for improving drivability of the vehicle. The fuel amount for starting the vehicle is calculated by using the above learning value of the fuel injection volume. In the case where the vehicle is in motion, the fuel amount immediately after the start of ignition and the fuel amount for acceleration and deceleration are applied for developing the drivability. Under these conditions, more fuel is added for the calculated learning value in the above manner, thereby providing a sufficient fuel injection despite the noncompliant fuel being used. Those of skill in the art will appreciate that the method described below can be applied to any fuel and is not restricted to the examples provided herein.

A method of identifying noncompliant fuel of a vehicle and improving drivability according to an embodiment of the present invention includes the following steps. First, the start of the vehicle is confirmed as shown in FIG. 1, step S10, then the present coolant temperature is measured, after the vehicle has been started. A coolant temperature factor value is set, according to the coolant temperature. The coolant temperature factor value is a constant for calculating the learning value of the fuel injection amount in Equation 1, which will be described below.

An RPM reference value is set, according to the present RPM, after the coolant temperature factor value has been set. It is determined whether an RPM incremental value reaches the RPM reference value, after the RPM reference value has been set according to RPM. As implicit from the above, the method of the present invention employs coolant temperature and RPM detection sensors which supply the values of the present coolant temperature and RPM in the form of signals to the ECM.

A calibration learning value is set when the RPM incremental value is smaller than the RPM reference value. A learning value of fuel injection volume is calculated after the calibration learning value has been set. Fuel injection volume for start injection is calculated using the calculated fuel injection volume. It is determined whether a start state of the vehicle has completed. Fuel injection volume after start injection and fuel injection for acceleration or deceleration are calculated, after the start state of the vehicle has completed. To note, the ECM handles the calculation of the learning value of the fuel injection amount, fuel amount after ignition, and fuel amount for acceleration and deceleration, as will be described in detail. Having determined these values, the ECM then sends the appropriate fuel injection signals to the fuel injectors so as to compensate for the effects of the incompliant fuel.

BRIEF DESCRIPTION OF THE DRAWINGS

For a better understanding of the nature and objects of the present invention, reference should be made to the following detailed description with the accompanying drawings, in which:

FIG. 2 is a table showing factor values which are set based on the coolant temperature according to an embodiment of the present invention.

FIG. 3 is a table showing RPM reference values which are set based on RPM, according to an embodiment of the present invention.

DETAILED DESCRIPTION OF THE PREFERRED EMBODIMENTS

Figure 1:
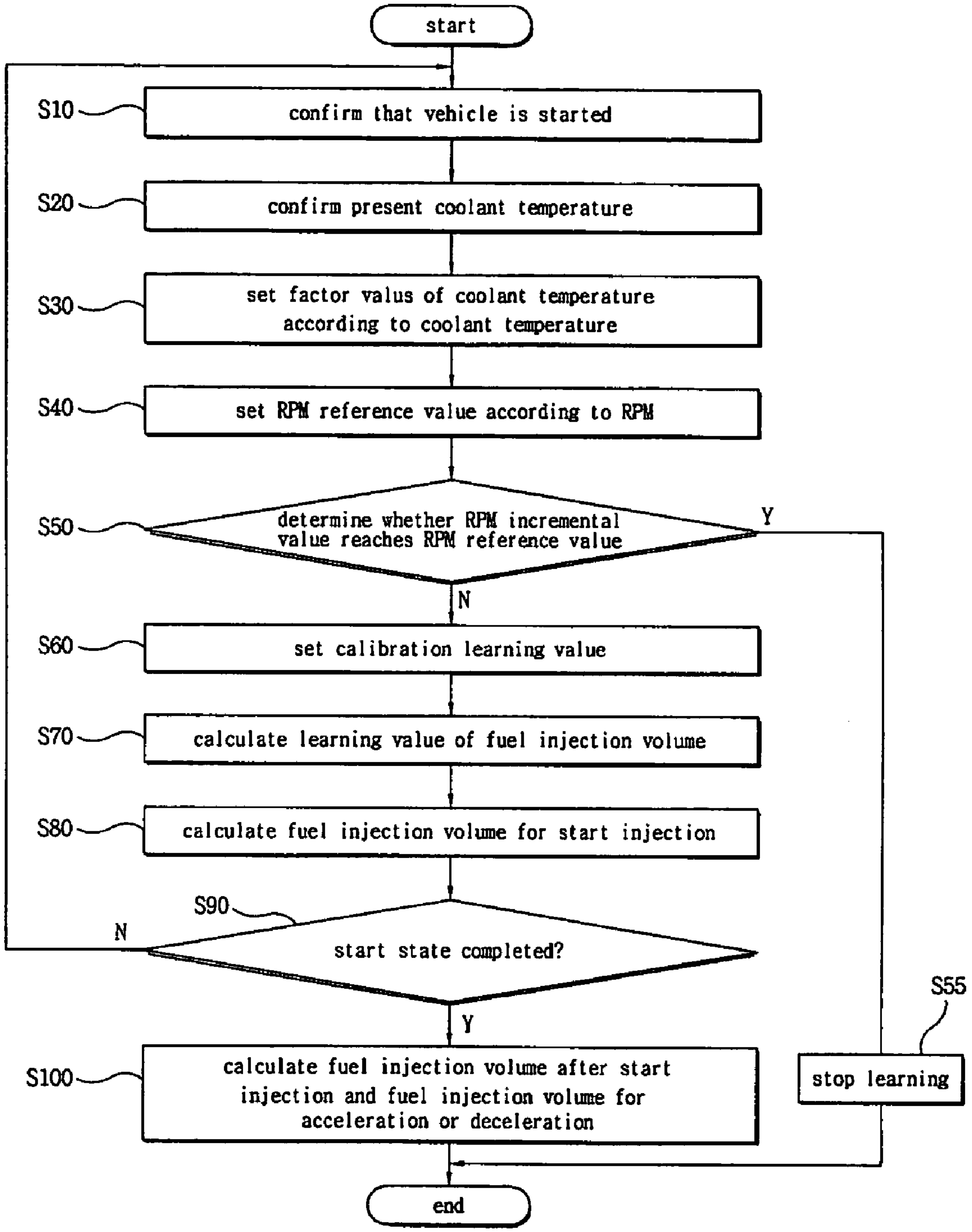
FIG. 1 is a flowchart illustrating a method of identifying noncompliant fuel and improving drivability, according to the present invention.

Hereinafter, the preferred embodiment of the present invention will be described with reference to the accompanying drawings.

FIG. 1 is a flowchart to illustrate a method of identifying noncompliant fuel and improving drivability, according to the present invention.

As shown in FIG. 1, in order to identify noncompliant fuel and improve drivability, a vehicle is started and thereafter the present coolant temperature is confirmed, at steps S10 and S20. To note, Step S10 of FIG. 1 refers to the state when the vehicle is started by the manipulation of the ignition key, which is to be distinguished from Step S90, which represents the end of the start ignition immediately prior to moment when the vehicle begins to move, e.g. RPM is greater than or equal to 1000.

According to the coolant temperature measured at step S20, a factor value of the temperature of the coolant is set at step S30. As shown in the table of FIG. 2, when the present coolant temperature is from −10 to 0° C., the factor value of the temperature of the coolant is set to be 1.05. When the present coolant temperature of the coolant is from 1 to 10° C., the factor value of the temperature of the coolant is set to be 1.1. Further, when the present coolant temperature is from 11 to 40° C., the factor value of the temperature of the coolant is set to be 1.15.

After the factor value of the temperature of the coolant is set at step S30, an RPM reference value. $\Delta N_{STD}$ is set according to RPM, at step S40. As shown in the table of FIG. 3, when the present RPM is greater than or equal to 0 and less than 300, an RPM reference value $\Delta N_{150}$ is set to be 150 RPM. When the present RPM is greater than or equal to 300 and less than 700, an RPM reference value $\Delta N_{150}$ is set to be 150 RPM. Further, when the present RPM is no less than 700 but less than 1000, the RPM reference value $\Delta N_{100}$ is set to be 100 RPM. In the RPM reference value $\Delta N_{STD}$, 'STD' is an abbreviation for Standard.

Turning now to the flowchart of FIG. 1, the factor value of the temperature of the coolant is set at step S30, and the RPM reference value is set at step S40. Thereafter, it is determined whether an RPM incremental value Δ N, that is, the difference between the present RPM and the previous RPM reaches an RPM reference value $\Delta N_{STD}$, at step S50.

In a detailed description, if the RPM incremental value exceeds the RPM reference value, at step S50, it is determined that the fuel is not noncompliant. At this time, learning stops, and the process returns to an initial step at step S55. The S55 learning stop signifies that a fuel injection is performed in accordance with the value stored in the memory without performing steps S60-S100 in the ECM. Furthermore, the calculated fuel amount after ignition and the fuel amount for acceleration and deceleration are applied after the signal of the fuel injection amount has been transmitted from the ECM to the injector.

However, if the RPM incremental value is less than the RPM reference value at step S50, it is determined that the fuel is noncompliant. At this time, a calibration learning value (Δ learning value) is set at step S60, and a learning value of fuel injection volume ST_AD is calculated using the calibration learning value, at step S70. In this case, it is preferable that the calibration learning value (Δ learning value) be set to 10% of the standard fuel injection volume. In this embodiment, the calibration learning value is set to 0.1.

After the calibration learning value (Δ learning value) is set, the learning value of the fuel injection volume ST_AD is calculated according to the following equation 1.

$$\text{learning value of fuel injection volume } (ST\_AD) = (1+\Delta \text{ learning value}) \times \text{factor value of present coolant temperature} \qquad \text{Equation 1}$$

The learning value of the fuel injection volume is calculated at step S70, and fuel injection volume for start-injection is calculated, at step S80. The fuel injection volume for start-injection is calculated according to the following equation 2.

$$\text{fuel injection volume for start-injection} = \text{standard fuel injection volume for start-injection} \times \text{learning value of fuel injection volume } (ST\_AD) \qquad \text{Equation 2}$$

After the fuel injection volume for start-injection is calculated, at step S80 whether the start state for the normal driving of a vehicle has been completed is determined. If the start of the vehicle has not completed, learning stops, and the process returns to the initial step. However, at steps S90 and S100, when the start state of the vehicle has completed, fuel injection volume after start injection and fuel injection volume for acceleration or deceleration are calculated using the learning value (ST_AD) of the fuel injection volume which was calculated at step S70. Thereafter, the obtained result is applied, thus increasing the drivability of the vehicle.

At step S100, the fuel injection volume after start injection and the fuel injection volume for acceleration or deceleration are calculated using the following equations 3 and 4.

fuel injection volume after start injection=standard fuel injection volume after start injection×learning value (*ST_AD*) of fuel injection volume    Equation 3

Fuel injection volume for acceleration or deceleration=standard fuel injection volume for acceleration or deceleration×learning value (*ST_AD*) of fuel injection volume    Equation 4

After it is determined whether the fuel is noncompliant, at step S50, the fuel injection volume after start injection and the fuel injection volume for acceleration or deceleration are additionally calculated and applied at step S100. Thereby, the drivability is improved when the vehicle is driven.

It is to be understood that the invention is not limited by any of the details of the description, and changes and variations may be made without departing from the spirit or scope of the following claims.

As apparent from the foregoing, there is an advantage in the present invention in that the determination of noncompliant fuel is accurate, and learning value of fuel injection volume is applied to fuel injection volume after start injection and fuel injection volume for acceleration or deceleration, thus improving the drivability of a vehicle.

What is claimed is:

1. A method of identifying noncompliant fuel of a vehicle and improving drivability, comprising the steps of:

confirming a present coolant temperature, after the vehicle has been started;

setting a coolant temperature factor value, according to the coolant temperature;

setting an RPM reference value, according to RPM, after the coolant temperature factor value has been set;

determining whether an RPM incremental value reaches the RPM reference value, after the RPM reference value has been set according to RPM;

setting a calibration learning value when the RPM incremental value is smaller than the RPM reference value;

calculating a learning value of fuel injection volume after the calibration learning value has been set;

calculating and conducting fuel injection volume for start injection using the calculated fuel injection volume;

determining whether a start state of the vehicle has completed; and calculating and applying fuel injection volume after start injection and fuel injection for acceleration or deceleration, after the start state of the vehicle has completed.

2. The method as defined in claim 1, wherein, at the RPM reference value setting step, when present RPM is greater than or equal to 0 and less than 300, the RPM reference value $\Delta N_{150}$ is set to 150 RPM, and, when present RPM is greater than or equal to 300 and less than 700 rpm, the RPM reference value $\Delta N_{150}$ is set to 150 RPM, and, when present RPM is from no less than 700 but less than 1000, the RPM reference value $\Delta N_{100}$ is set to 100 RPM.

3. The method as defined in claim 1, wherein the RPM incremental value corresponds to a difference between the present RPM and previous RPM.

4. The method as defined in claim 1, wherein the start injection is calculated using the following equation:

fuel injection volume for start injection=standard fuel injection volume for start injection×learning value of fuel injection volume (*ST_AD*).

5. The method as defined in claim 1, wherein the fuel injection volume after start injection is calculated using the following equation:

fuel injection volume after start injection=standard fuel injection volume after start injection×learning value of fuel injection volume.

6. The method as defined in claim 1, wherein the fuel injection volume for acceleration or deceleration is calculated using the following equation:

fuel injection volume for acceleration or deceleration=standard fuel injection volume for acceleration or deceleration×learning value of fuel injection volume.

7. The method as defined in claim 1, further comprising the step of:

stopping learning and returning to an initial step when the RPM incremental value exceeds the RPM reference value or the start state of the vehicle has not completed.

8. The method as defined in claim 1, wherein, at the coolant temperature factor value setting step, when the present coolant temperature is from −10 to 0° C., the coolant temperature factor value is set to be 1.05, and, when the present coolant temperature is from 1 to 10° C., the coolant temperature factor value is set to be 1.1, and, when the present coolant temperature is from 11 to 40° C., the coolant temperature factor value is set to be 1.15.

9. The method as defined in claim 1, wherein the calibration learning value (Δ learning value) is set to be 10% of a standard fuel injection volume.

10. The method as defined in any one of claims 1, 8 and 9, wherein the learning value of the fuel injection volume is calculated using the following equation:

learning value of fuel injection volume (*ST_AD*)=(1+Δ learning value)×present coolant temperature factor value.

* * * * *